US010853962B2

(12) United States Patent
Ueno

(10) Patent No.: US 10,853,962 B2
(45) Date of Patent: Dec. 1, 2020

(54) DEVICE, SYSTEM, AND METHOD OF DETERMINING RECLINING STATE

(71) Applicant: Panasonic Intellectual Property Management Co., Ltd., Osaka (JP)

(72) Inventor: Taku Ueno, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 95 days.

(21) Appl. No.: 15/902,210

(22) Filed: Feb. 22, 2018

(65) Prior Publication Data

US 2019/0259171 A1 Aug. 22, 2019

(51) Int. Cl.
| | | |
|---|---|---|
| *G06K 9/00* | (2006.01) | |
| *G06T 7/70* | (2017.01) | |
| *B64D 11/06* | (2006.01) | |
| *B60N 2/20* | (2006.01) | |
| *B64D 11/00* | (2006.01) | |
| *B60N 2/22* | (2006.01) | |
| *B60N 2/02* | (2006.01) | |

(52) U.S. Cl.
CPC .............. *G06T 7/70* (2017.01); *B60N 2/0248* (2013.01); *B60N 2/20* (2013.01); *B60N 2/22* (2013.01); *B64D 11/00155* (2014.12); *B64D 11/064* (2014.12); *B60N 2002/0272* (2013.01); *G06T 2207/30268* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0012375 A1* | 1/2005 | Giasson | ................. | B64D 11/06 |
| | | | | 297/411.31 |
| 2010/0045088 A1 | 2/2010 | Kunou | | |
| 2015/0312546 A1* | 10/2015 | Hasegawa | ............ | H04N 13/398 |
| | | | | 348/59 |

FOREIGN PATENT DOCUMENTS

| | | |
|---|---|---|
| JP | 2005-136561 | 5/2005 |
| JP | 2008-279155 | 11/2008 |
| JP | 2013-235220 | 11/2013 |
| JP | 2015-210297 | 11/2015 |

\* cited by examiner

*Primary Examiner* — Alex Kok S Liew
(74) *Attorney, Agent, or Firm* — Wenderoth, Lind & Ponack, L.L.P.

(57) ABSTRACT

A reclining state determination device includes a detecting unit, an image capturing unit, and a control unit. The detecting unit detects an acceleration of a display device attached, so as to be capable of tilting, to a rear surface of a reclining seat. The image capturing unit captures an image from the display device. The control unit determines a reclining state of the reclining seat on the basis of the captured image and the detected acceleration.

9 Claims, 27 Drawing Sheets

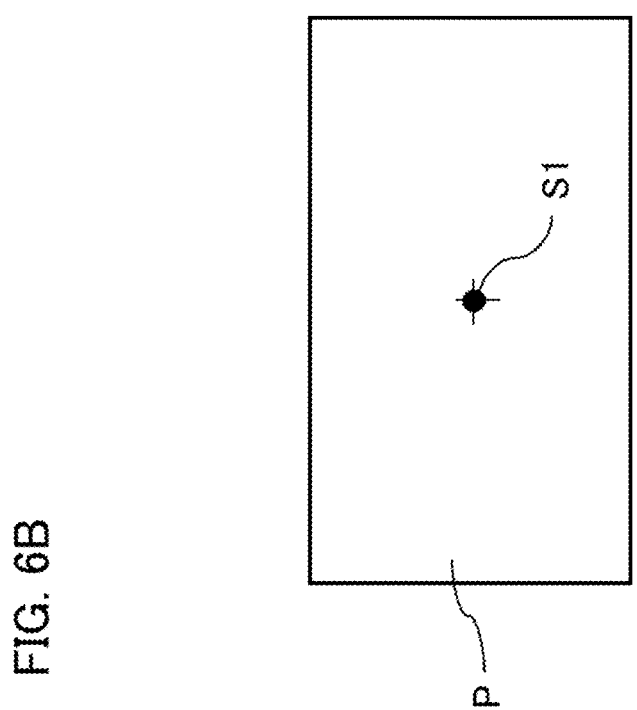

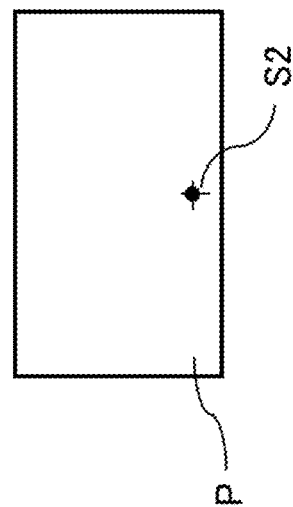

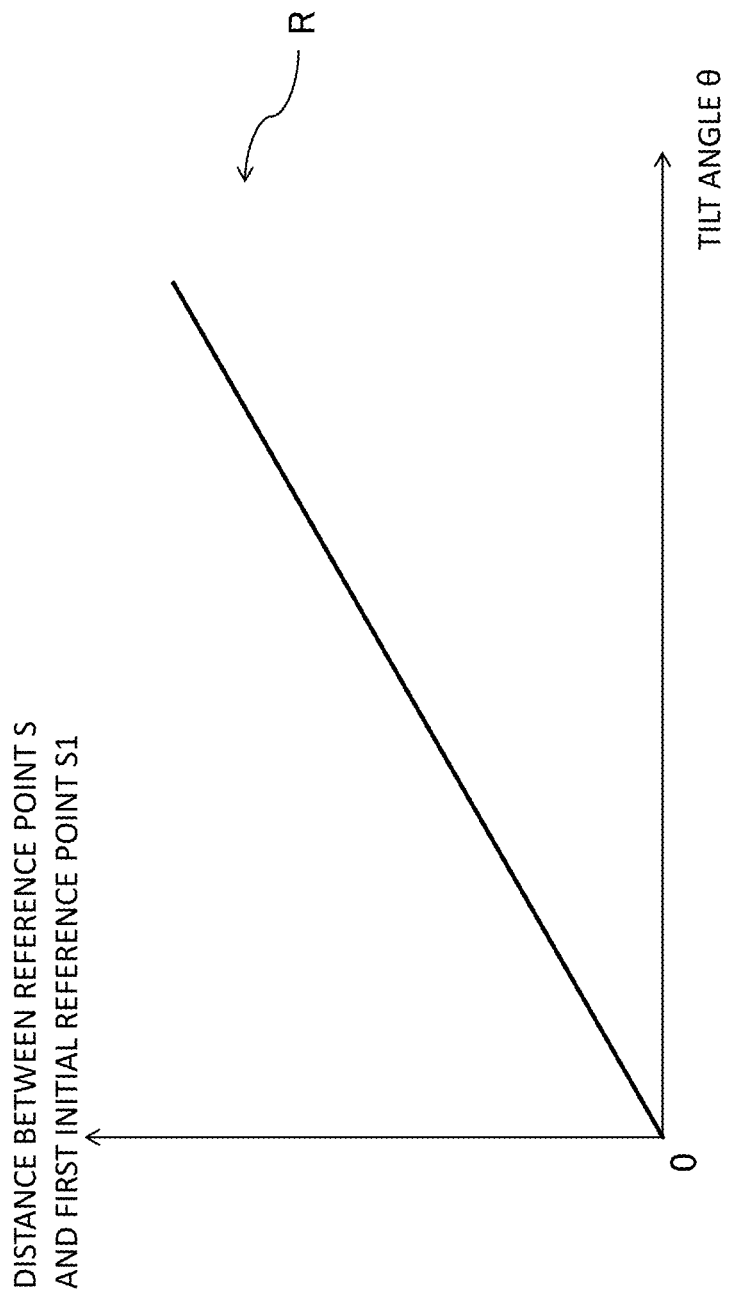

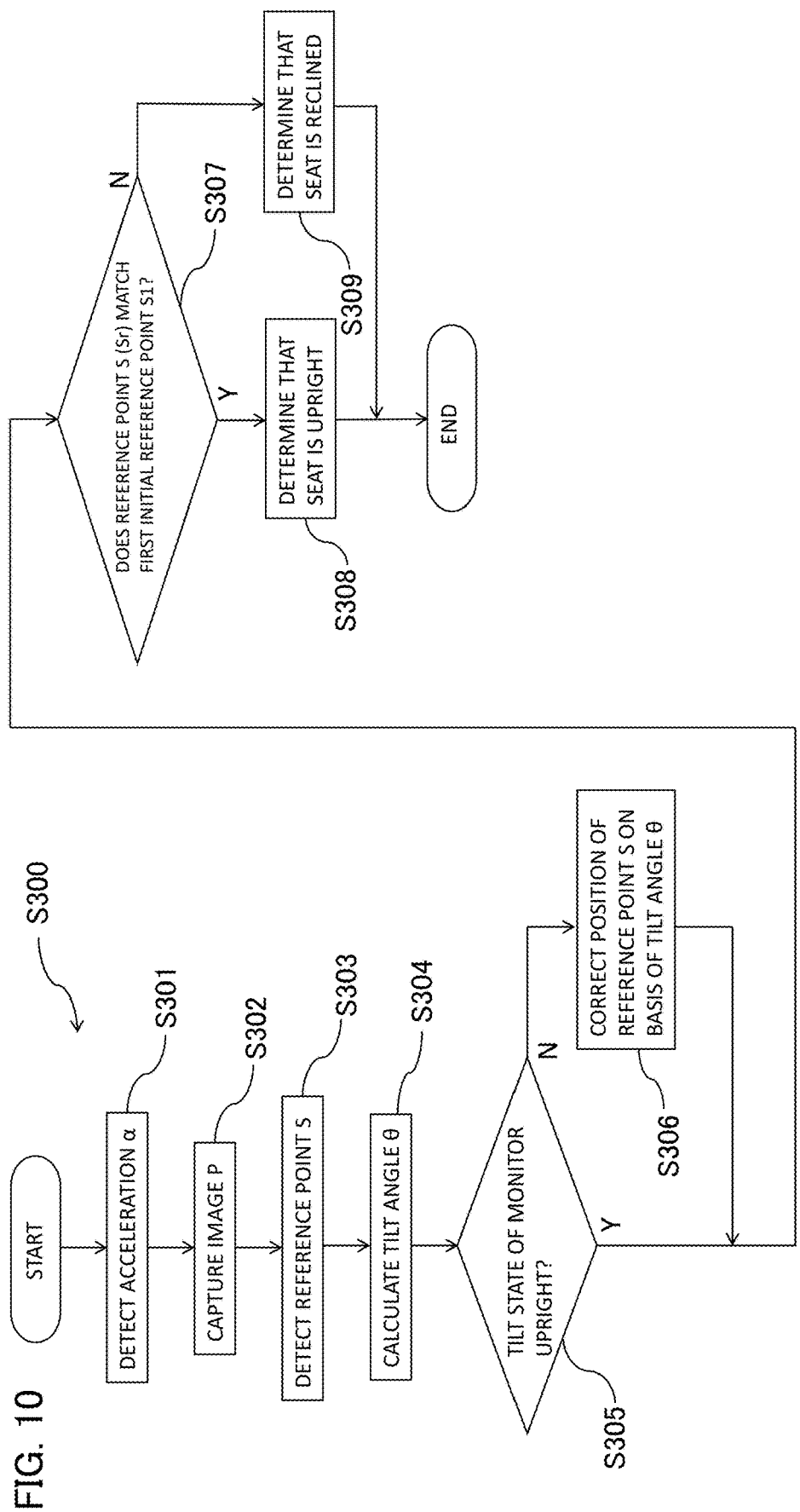

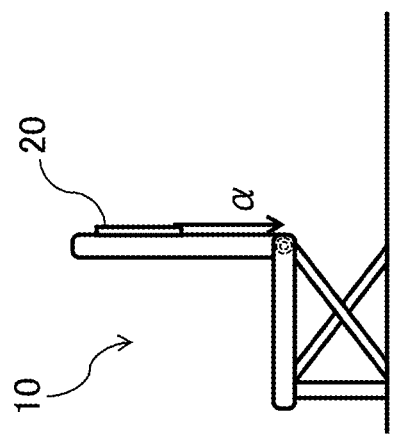

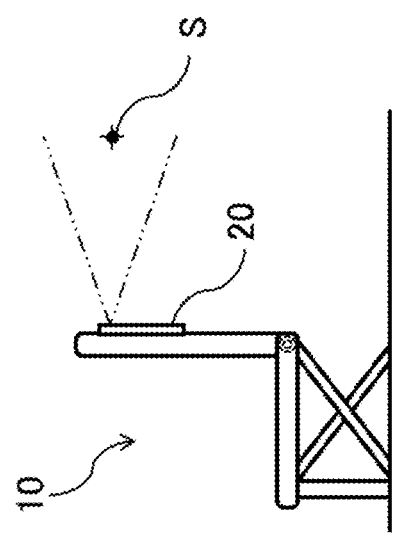

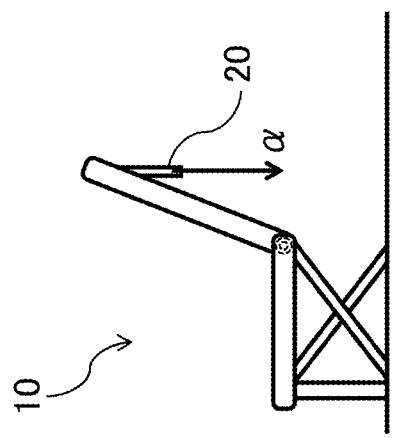

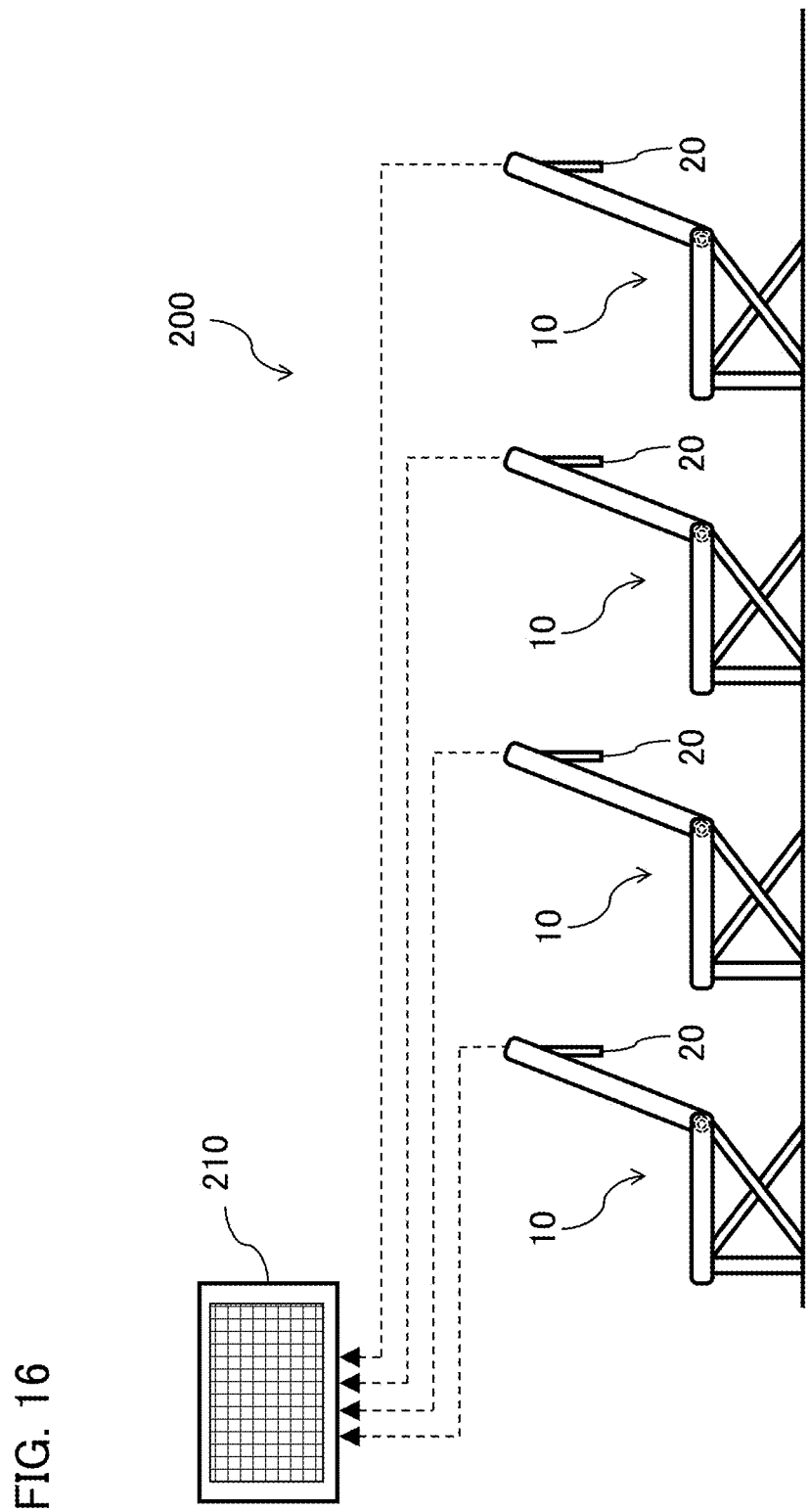

DEVICE, SYSTEM, AND METHOD OF DETERMINING RECLINING STATE

BACKGROUND

Technical Field

This disclosure relates to a device, a system, and a method of determining a reclining state of a reclining seat of an aircraft.

Description of the Related Art

In a reclining seat, it is conceivable to determine the reclining state of the reclining seat (that is, whether or not the seat is reclined) by using an accelerometer provided in a monitor attached to the rear surface of the backrest. However, the monitor is attached so as to be capable of being tilted relative to the backrest, and there are thus cases where the reclining state cannot be determined accurately when the monitor is tilted.

SUMMARY

This disclosure provides a device, a system, and a method of determining a reclining state of a reclining seat of an aircraft.

The reclining state determination device disclosed here includes a detecting unit, an image capturing unit, and a control unit. The detecting unit detects an acceleration of a display device attached, so as to be capable of tilting, to a rear surface of a reclining seat in an aircraft. The image capturing unit captures an image from the display device. The control unit determines a reclining state of the reclining seat on the basis of the captured image and the detected acceleration.

The reclining state determination system disclosed here includes the above-described reclining state determination device and an output device. The output device outputs the reclining state of the reclining seat at a predetermined time including when the aircraft takes off or when the aircraft lands.

The reclining state determination method disclosed here includes: detecting an acceleration of a display device attached, so as to be capable of tilting, to a rear surface of a reclining seat in an aircraft; capturing an image from the display device; and determining a reclining state of the reclining seat on the basis of the captured image and the detected acceleration.

The device, a system, and a method of determining a reclining state of a reclining seat disclosed here are useful in accurately determining the reclining state of a reclining seat.

BRIEF DESCRIPTION OF THE DRAWINGS

FIG. 6B is a schematic diagram illustrating operations carried out in the first initial data recording control.

FIG. 8C is a schematic diagram illustrating operations carried out in the second initial data recording control.

FIG. 9 is a graph illustrating a correlation between the location of a reference point and a tilt angle.

FIG. 10 is a flowchart illustrating operations carried out in reclining state determination control.

FIG. 11A is a schematic diagram illustrating actions of the reclining state determination control when a reclining seat and a monitor are upright.

FIG. 11B is a schematic diagram illustrating actions of the reclining state determination control when the reclining seat and the monitor are upright.

FIG. 12A is a schematic diagram illustrating actions of the reclining state determination control when the reclining seat is reclined and the monitor is upright.

FIG. 16 is a schematic diagram illustrating the configuration of a reclining state determination system according to a first variation.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1. Reclining State Determination Device

1-1. Aircraft Reclining Seat

Figure 1:
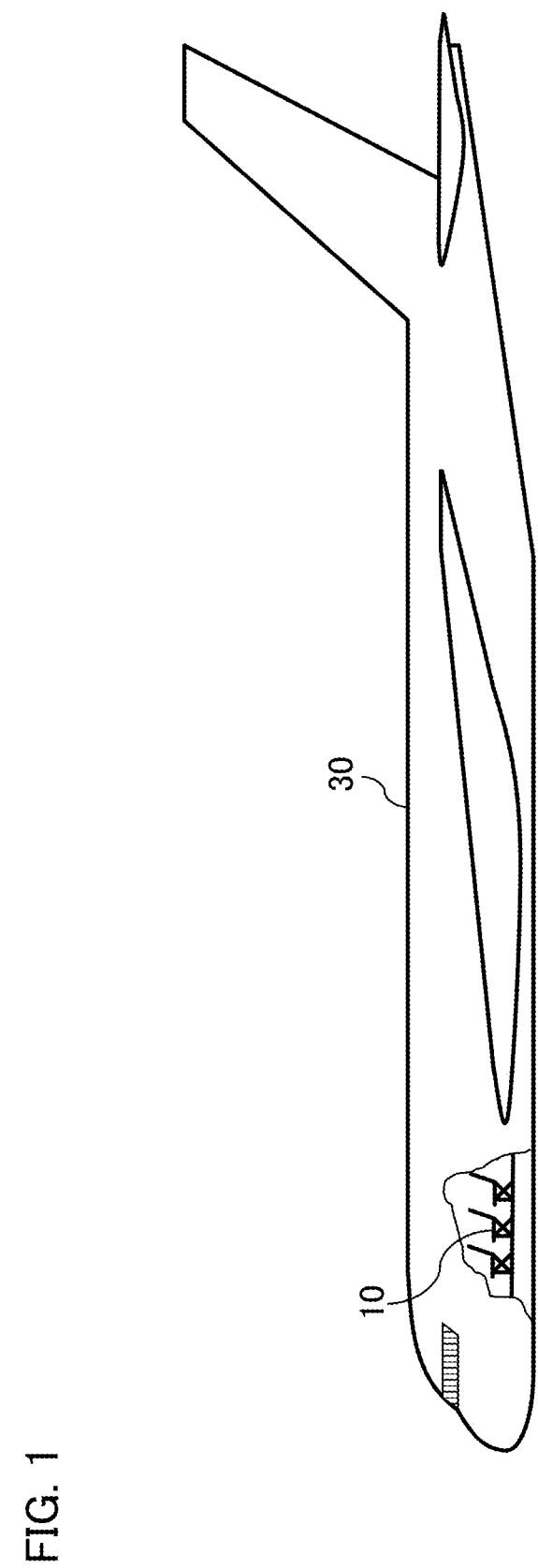
FIG. 1 is a schematic diagram illustrating the configuration of an aircraft.

The configuration of an aircraft 30 will be described using FIG. 1.

The aircraft 30 according to this embodiment is assumed to be a passenger airplane. A plurality of reclining seats 10 are arranged in the cabin of the aircraft 30 as passenger seats.

Figure 2:
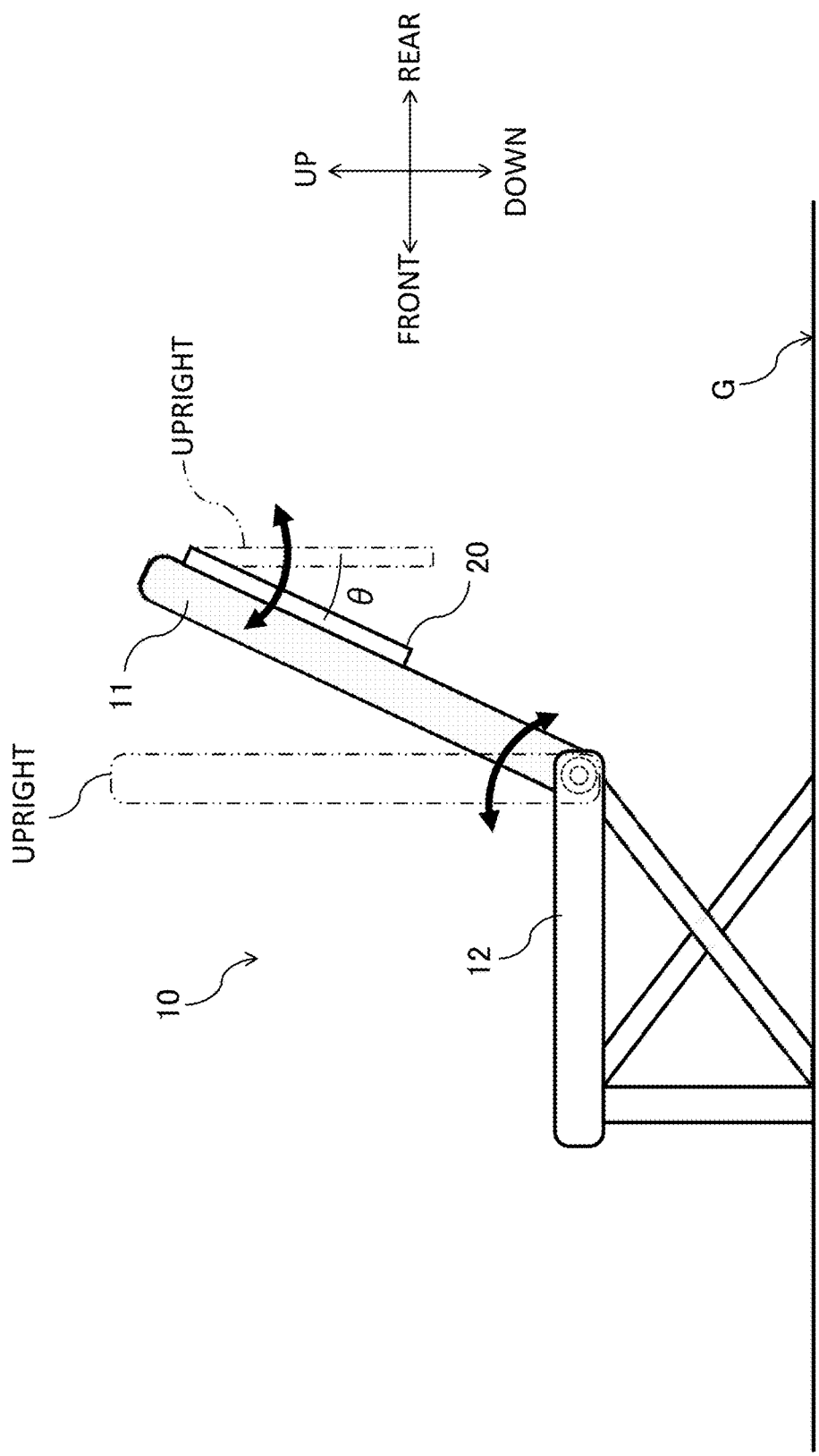
FIG. 2 is a schematic diagram illustrating the configuration of a reclining seat.

The configuration of the reclining seat 10 will be described using FIG. 2. The following descriptions will follow the "front", "rear", "up", and "down" directions indicated in FIG. 2.

The reclining seat 10 is provided on a floor surface G. The reclining seat 10 includes a backrest 11, a seat top 12, and a monitor 20 serving as a display device.

A lower end part of the backrest 11 is attached to a rear end part of the seat top 12. The backrest 11 is configured to be capable of tilting rearward central to the lower end part of the backrest 11. The monitor 20 is attached to the rear surface (back surface) of the backrest 11. An upper end part of the monitor 20 is attached to an upper end part of the backrest 11. The monitor 20 is configured to be capable of tilting rearward central to the upper end part of the monitor 20.

In the following descriptions, when the backrest 11 is not in a tilted state, i.e. when the reclining seat 10 is not in a reclining state, the backrest 11 is substantially upright relative to the floor surface G, and thus the reclining seat 10 will be referred to as being "upright". On the other hand, when the backrest 11 is even slightly tilted, the reclining seat 10 will be referred to as being "reclined". The "reclining state" refers to either a state in which the reclining seat 10 is "upright" or a state in which the reclining seat 10 is "reclined".

When the monitor 20 is substantially upright relative to the floor surface G, the monitor 20 will be referred to as being "upright". Here, the monitor 20 being "substantially upright" is assumed to include states where the monitor 20 is tilted at an angle within 5 to 6° from the vertical direction. On the other hand, when the monitor 20 is not substantially upright relative to the floor surface G, the monitor 20 will be referred to as being "tilted". A "tilt state of the monitor" refers either to a state in which the monitor 20 is "upright" or to a state in which the monitor 20 is "tilted at a tilt angle θ" relative to the vertical direction.

1-2. Monitor

Figure 3:
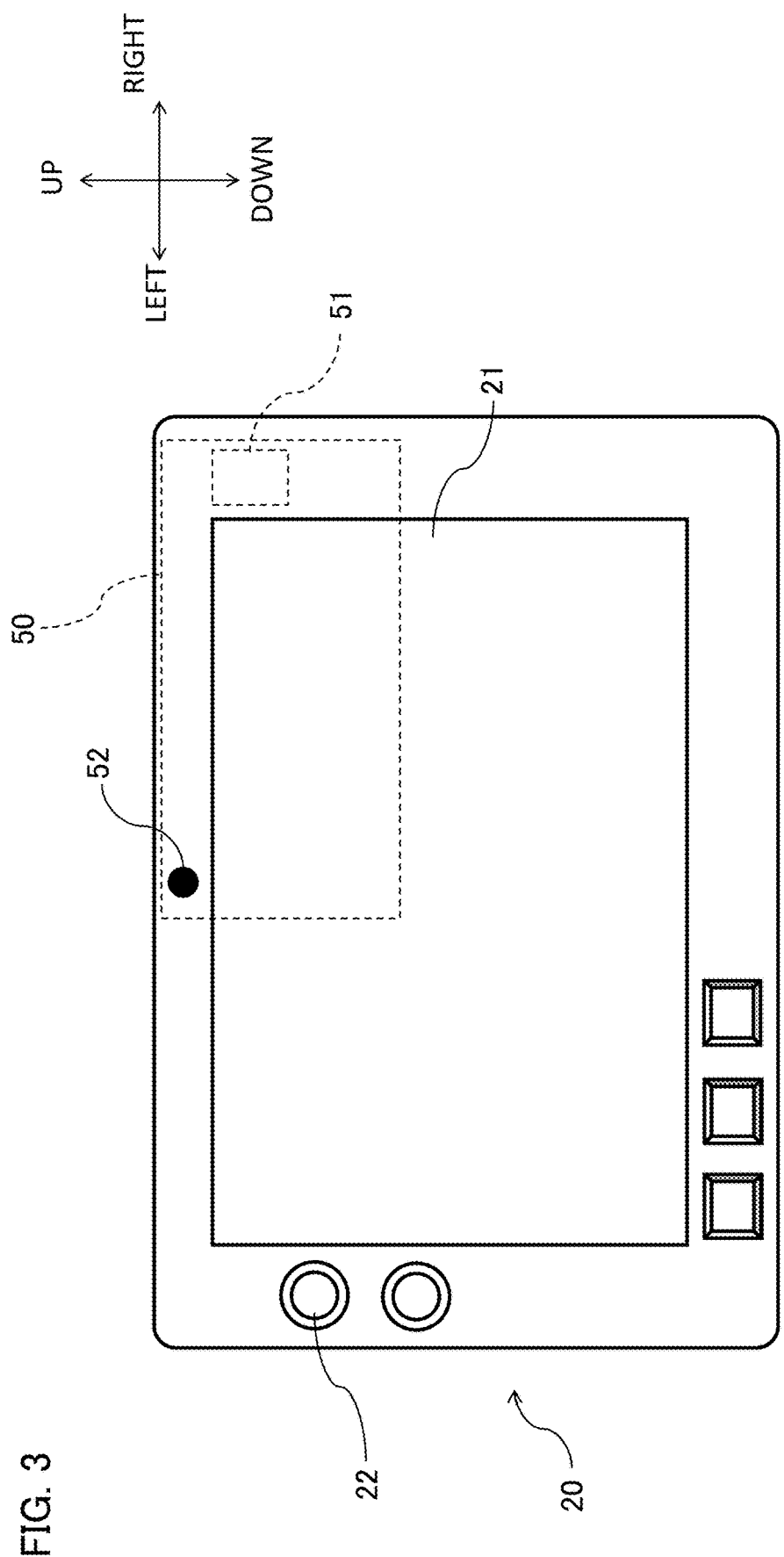
FIG. 3 is a schematic diagram illustrating the configuration of a monitor.

The configuration of the monitor 20 will be described using FIG. 3. The configuration of the monitor 20 will be described following the "left", "right", "up", and "down" directions indicated in FIG. 3.

The monitor 20, which serves as a display device, allows a passenger seated in the reclining seat 10 behind the monitor 20 to enjoy movies, games, and the like and check flight information of the aircraft 30. The monitor 20 includes a display 21, operating buttons 22, and a reclining state determination device 50.

The display 21 is arranged in the center of the surface of the monitor 20, and displays movies and game screens, for example. The operating buttons 22 are arranged in, for example, a left end part of the surface of the monitor 20, and are used to control movies, games, and so on, for example. The reclining state determination device 50 is provided within the monitor 20.

The reclining state determination device 50 includes a camera 52, which serves as an image capturing unit, and an accelerometer 51, which serves as a detecting unit. The camera 52 is arranged in, for example, what is substantially the center of the upper end part of the monitor 20, and captures an image to the front of the monitor 20 (this corresponds to the rearward direction in FIG. 2). The accelerometer 51 detects an acceleration α of the monitor 20.

1-3. Reclining State Determination Device

Figure 4:
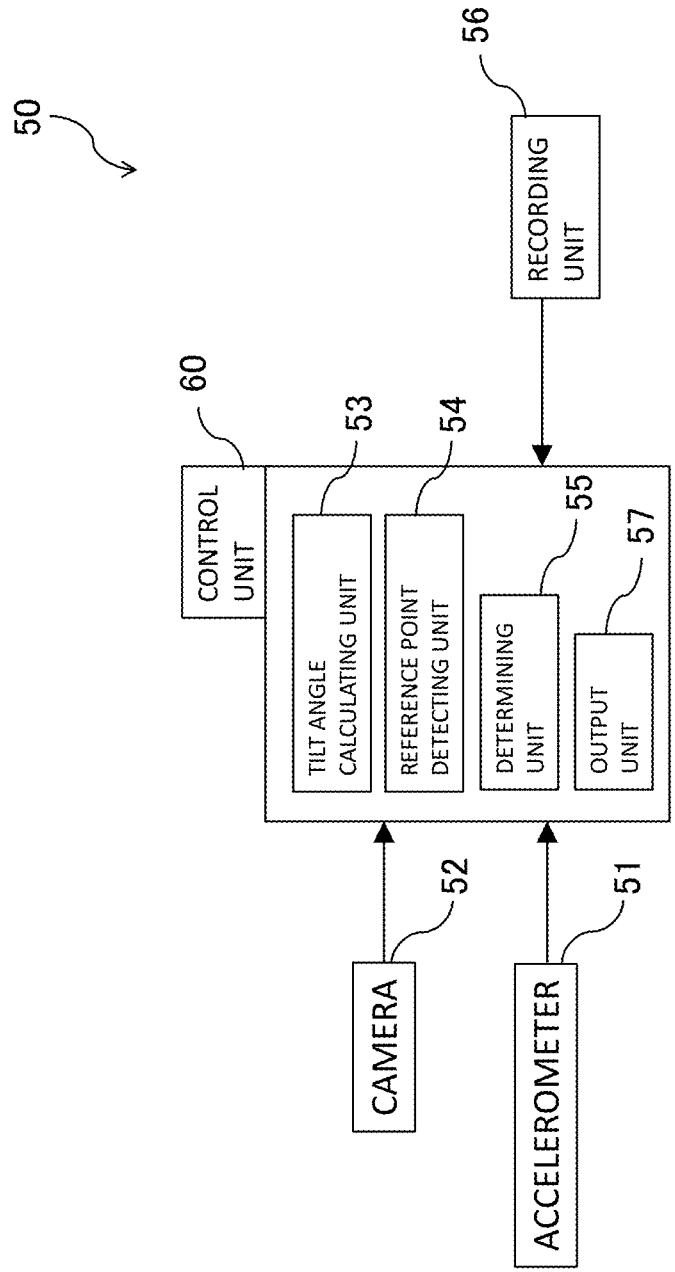
FIG. 4 is a schematic diagram illustrating the configuration of a reclining state determination device.

The configuration of the reclining state determination device 50 will be described using FIG. 4.

The reclining state determination device 50 is a device that determines the reclining state of the reclining seat 10. The reclining state determination device 50 includes the camera 52, which serves as an image capturing unit, the accelerometer 51, which serves as a detecting unit, a control unit 60, and a recording unit 56. The control unit 60 includes a tilt angle calculating unit 53, a reference point detecting unit 54, a determining unit 55, and an output unit 57.

The accelerometer 51 detects the acceleration α of the monitor 20. The camera 52 captures an image to the front of the monitor 20.

The tilt angle calculating unit 53 is a processor or a circuit that executes processes in accordance with a predetermined program. The tilt angle calculating unit 53 calculates the tilt state of the monitor 20 from the acceleration α, which is sent from the accelerometer 51.

The reference point detecting unit 54 is a processor or a circuit that executes processes in accordance with a predetermined program. The reference point detecting unit 54 detects a reference point S in an image P sent from the camera 52.

The recording unit 56 serves as working memory, and temporarily stores a control program, data, and so on. The recording unit 56 records the reference point S sent from the reference point detecting unit 54 or the tilt state of the monitor 20 sent from the tilt angle calculating unit 53.

The determining unit 55 is a processor or a circuit that executes processes in accordance with a predetermined program. The determining unit 55 determines the reclining state on the basis of the reference point S or the tilt state of the monitor 20 sent from the recording unit 56 or the tilt angle calculating unit 53.

The output unit 57 outputs the reclining state, which is sent from the determining unit 55, to an external device.

1-3-1. First Initial Data Recording Control

Figure 5:
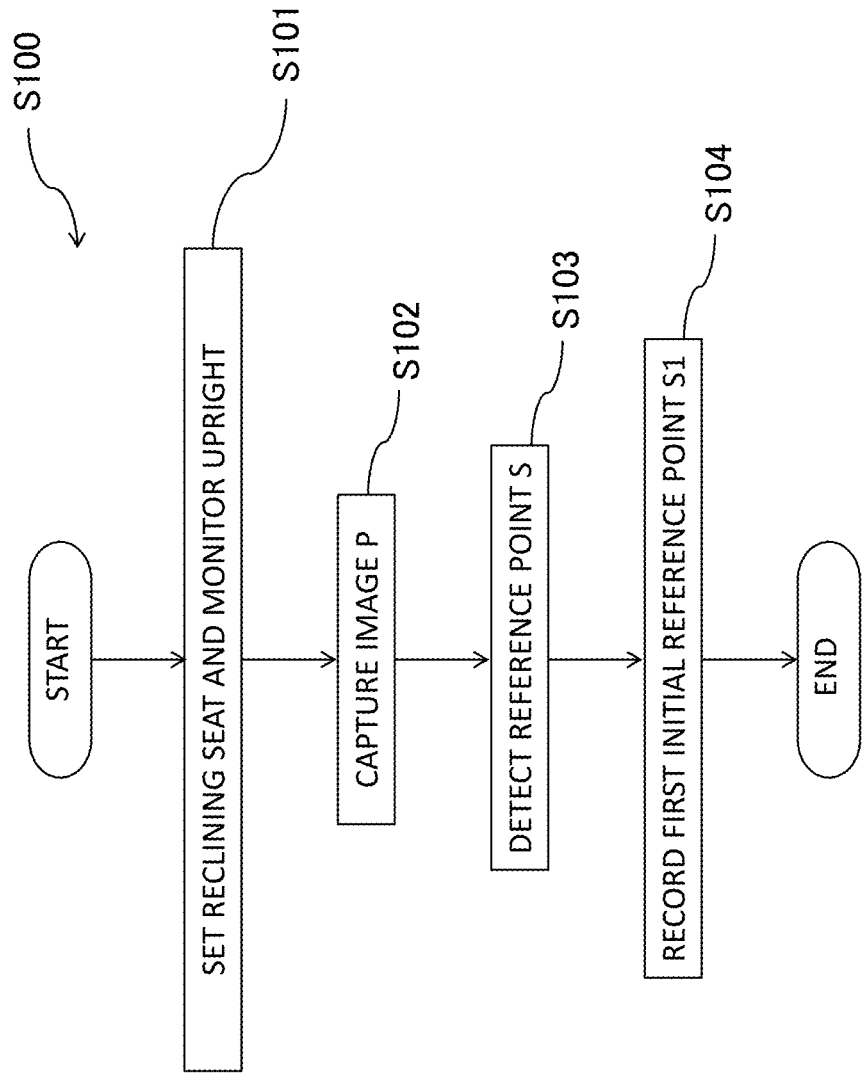
FIG. 5 is a flowchart illustrating operations carried out in first initial data recording control.
Figure 6A:
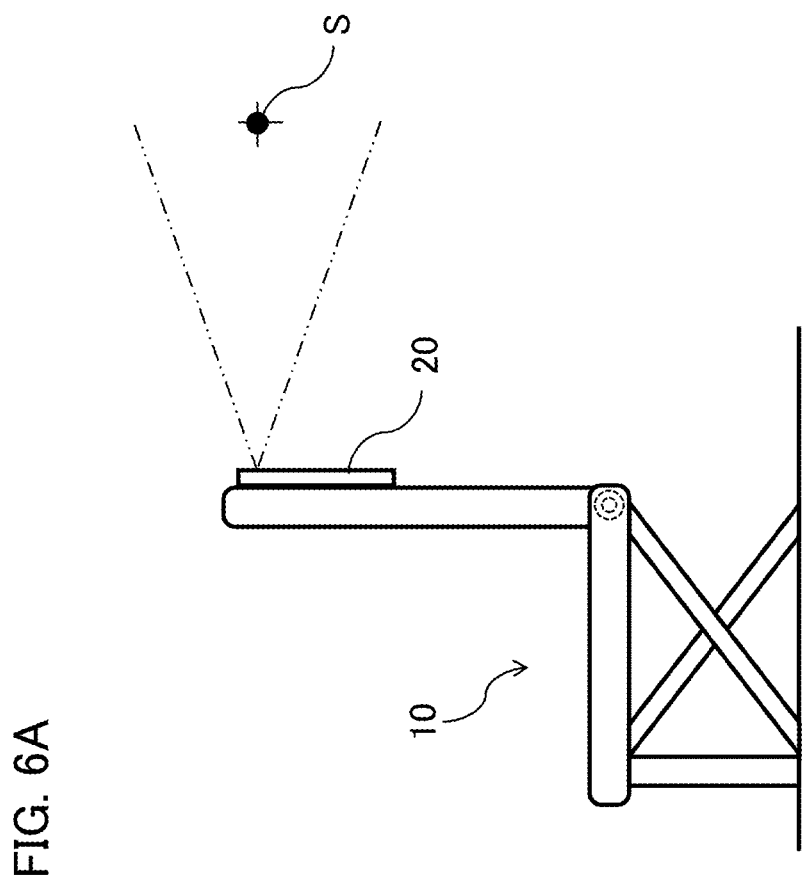
FIG. 6A is a schematic diagram illustrating operations carried out in the first initial data recording control.
Figure 7:
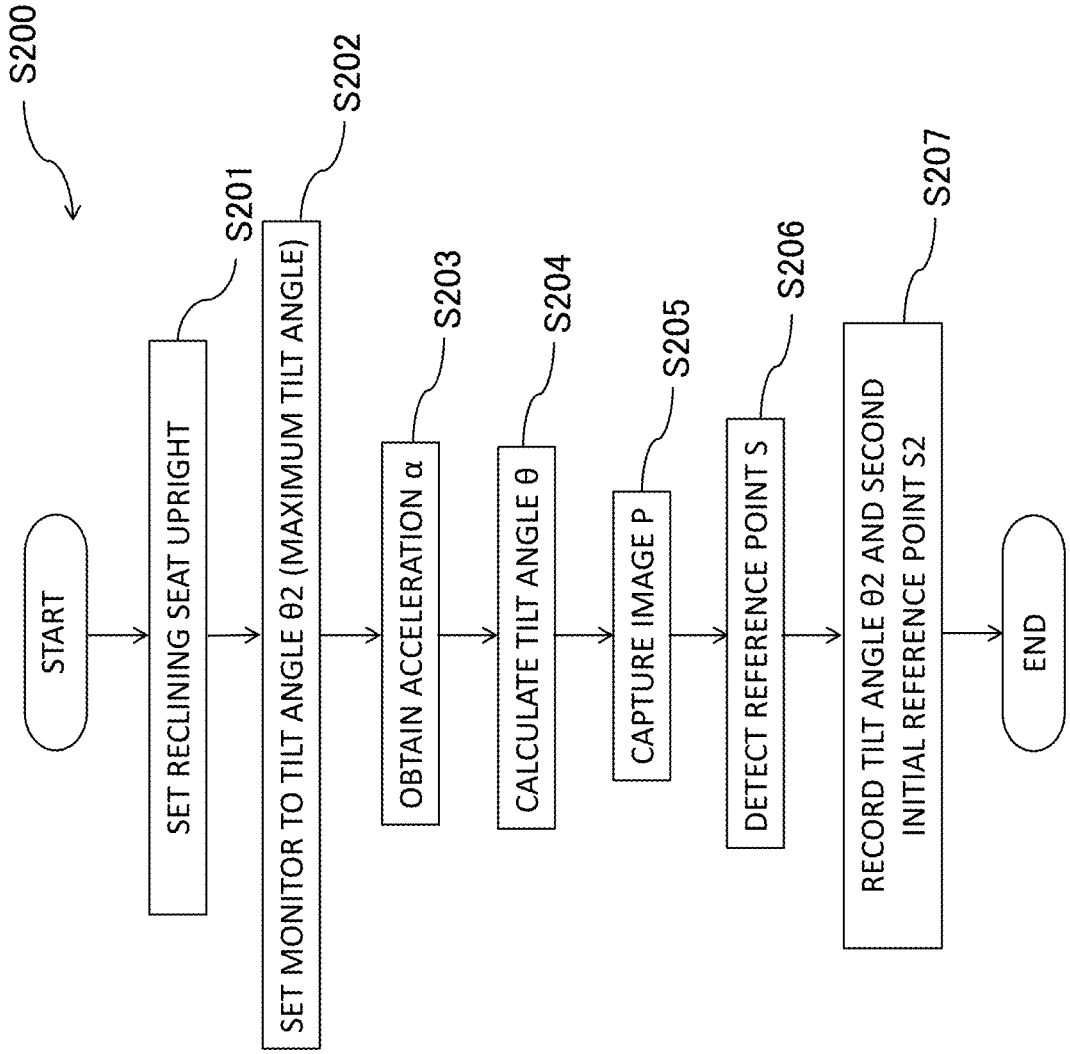
FIG. 7 is a flowchart illustrating operations carried out in second initial data recording control.
Figure 8A:
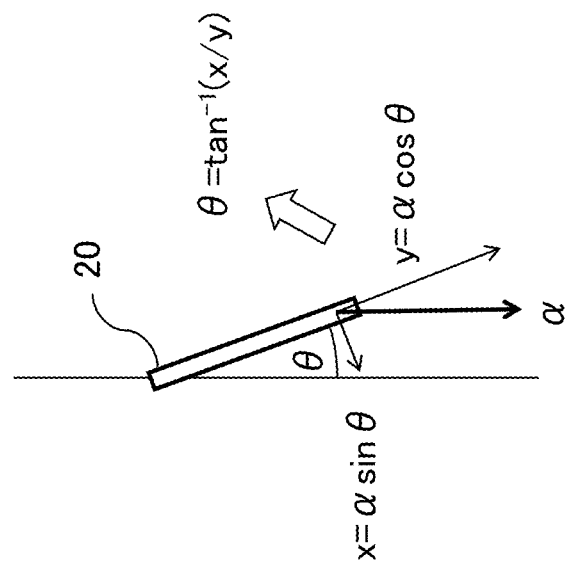
FIG. 8A is a schematic diagram illustrating operations carried out in the second initial data recording control.
Figure 8B:
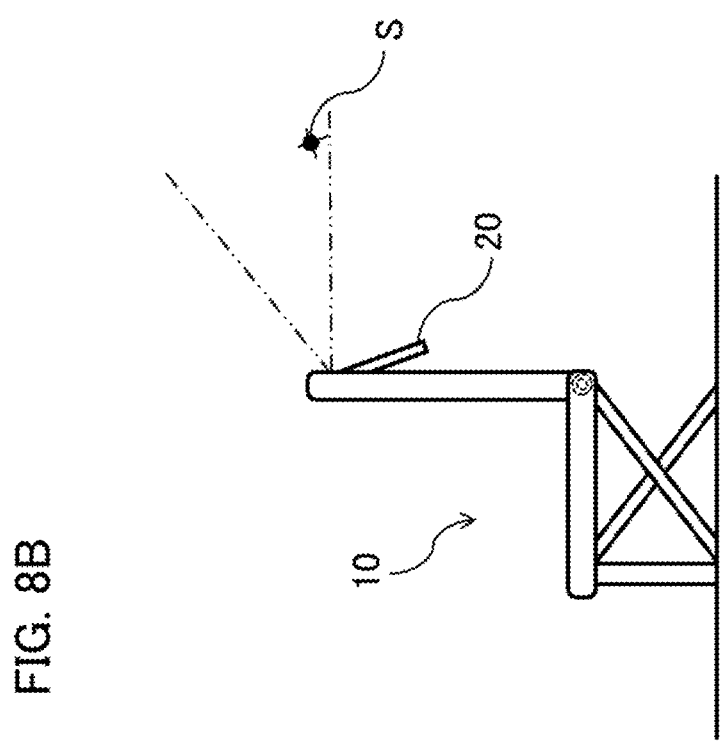
FIG. 8B is a schematic diagram illustrating operations carried out in the second initial data recording control.

Operations carried out in first initial data recording control S100 will be described using FIGS. 5, 6A, and 6B.

The first initial data recording control S100 is executed in advance of reclining state determination control S300, which will be described later. The first initial data recording control S100 is carried out, for example, during service prior to the departure of the aircraft 30.

In step S101, a worker puts the reclining seat 10 and the monitor 20 upright. The worker is, for example, a mechanic of the aircraft 30. In step S102, the camera 52 captures the image P. In step S103, the reference point detecting unit 54 detects the reference point S in the image P. Any fixed point within the aircraft 30, such as a window frame, a storage compartment, a lighting fixture, or an air conditioning vent, can be used as the reference point S. In step S104, the recording unit 56 records the reference point S detected in step S103 as a first initial reference point S1. The recording unit 56 also records a tilt angle of 0 as an initial tilt angle.

1-3-2. Second Initial Data Recording Control

Operations carried out in second initial data recording control S200 will be described using FIGS. 7, 8A, 8B, and 8C.

The second initial data recording control S200 is executed after the first initial data recording control S100. The second initial data recording control S200 is carried out, for example, during service prior to the departure of the aircraft 30.

In step S201, a worker puts the reclining seat 10 upright. In step S202, the worker tilts the monitor 20 to a tilt angle θ2, which is a maximum tilt angle, relative to the backrest 11. In step S203, the accelerometer 51 detects the acceleration α. At this time, only gravitational acceleration in the vertical direction is acting on the monitor 20.

In step S204, the tilt angle calculating unit 53 calculates the tilt angle θ from the detected acceleration α. Specifically, of the components detected by the accelerometer 51, an acceleration component x, which is α sin θ, and an acceleration component y, which is α cos θ, are detected, and the tilt angle θ is calculated as $\theta=\tan^{-1}(x/y)$. Here, the backrest 11 is upright, i.e. is substantially perpendicular to the floor surface G, and thus the tilt angle θ2 is calculated.

In step S205, the camera 52 captures the image P. In step S206, the reference point detecting unit 54 detects the reference point S in the image P. In step S207, the recording unit 56 records the reference point S detected in step S206 as a second initial reference point S2, and the tilt angle θ detected in step S204 (θ2).

1-3-3. Correlation Between Reference Point and Tilt Angle

A correlation R between the position of the reference point S and the tilt angle θ will be described using FIG. 9.

In the first initial data recording control S100, the first initial reference point S1 and a tilt angle of 0, for a state in which the reclining seat 10 and the monitor 20 are upright, are recorded in the recording unit 56. In the second initial data recording control S200, the second initial reference point S2 and the tilt angle θ2, for a state in which the reclining seat 10 is upright and the monitor 20 is at the maximum tilt angle θ2, are recorded in the recording unit 56.

As such, the correlation R between the position of the reference point S from the first initial reference point S1 and the tilt angle θ is recorded in the recording unit 56. In other words, if the tilt angle θ is known, the position of the reference point S from the first initial reference point S1 can be found on the basis of the correlation R. To rephrase, if the tilt angle θ is known, the reference point S can be corrected to a corrected reference point Sr (the position of the reference point S when the monitor 20 is upright) on the basis of the correlation R.

1-3-4. Reclining State Determination Control

Operations carried out in the reclining state determination control S300 will be described using FIG. 10.

The reclining state determination control S300 is control that determines the reclining state of the reclining seat 10. The reclining state determination control S300 is executed at predetermined times, including when the aircraft 30 takes off and lands.

In step S301, the accelerometer 51 detects the acceleration α. It is assumed that at this time, acceleration from the travel of the aircraft 30 is ignored and only the gravitational acceleration acting on the monitor is detected.

In step S302, the camera 52 captures the image P. In step S303, the reference point detecting unit 54 detects the reference point S in the image P.

In step S304, the tilt angle calculating unit 53 calculates the tilt angle θ of the monitor 20. The method of calculating the tilt angle θ of the monitor 20 is the same as that of step S204 in the second initial data recording control S200.

In step S305, the determining unit 55 determines whether or not the monitor 20 is in an upright tilt state. If the monitor 20 is in an upright tilt state, the process moves to step S307. If the monitor 20 is not in an upright tilt state, i.e. is tilted at the tilt angle θ, the process moves to step S306. In step S306, the determining unit 55 corrects the reference point S to the corrected reference point Sr on the basis of the tilt angle θ and the correlation R.

In step S307, the determining unit 55 determines whether or not the reference point S (or the corrected reference point Sr) matches the first initial reference point S1. If the reference point S (or the corrected reference point Sr) matches the first initial reference point S1, the process moves to step S308. If the reference point S (or the corrected reference point Sr) does not match the first initial reference point S1, the process moves to step S309.

"Matching" here need not mean that the pixels of the reference point S match the first initial reference point S1 perfectly, and may also mean that the pixels of the reference point S are within a set range of pixels that contains the first initial reference point S1, for example. The "set range of pixels" is assumed to include an amount by which the reclining seat 10 sinks down when a passenger is seated in the reclining seat 10 as compared to when a passenger is not seated in the reclining seat 10.

In step S308, the determining unit 55 determines that the reclining state of the reclining seat 10 is "upright". In step S309, the determining unit 55 determines that the reclining state of the reclining seat 10 is "reclined".

1-3-4-1. Actions (when Reclining Seat and Monitor are Upright)

Figure 11C:
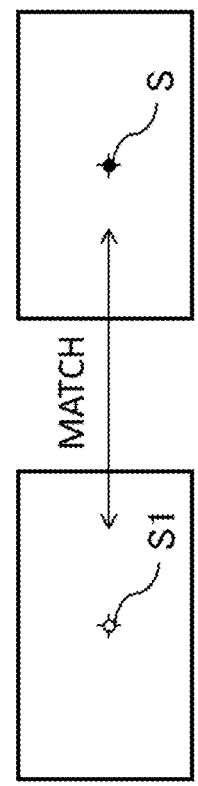
FIG. 11C is a schematic diagram illustrating actions of the reclining state determination control when the reclining seat and the monitor are upright.

Actions of the reclining state determination control S300 when the reclining seat 10 and the monitor 20 are upright will be described using FIGS. 11A, 11B, and 11C.

In step S301, the acceleration α is detected. In step S302, the image P is captured. In step S303, the reference point S is detected in the image P. In step S304, the tilt angle θ is calculated as 0.

In step S305, the monitor 20 is upright, and thus the process moves to step S307. In step S307, the reference point S and the first initial reference point S1 match, and thus the process moves to step S308. In step S308, the reclining state of the reclining seat 10 is determined to be "upright".

1-3-4-2. Actions (when Reclining Seat is Reclined and Monitor is Upright)

Figure 12B:
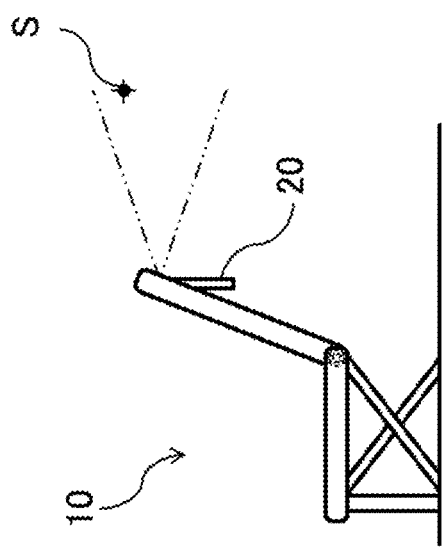
FIG. 12B is a schematic diagram illustrating actions of the reclining state determination control when the reclining seat is reclined and the monitor is upright.
Figure 12C:
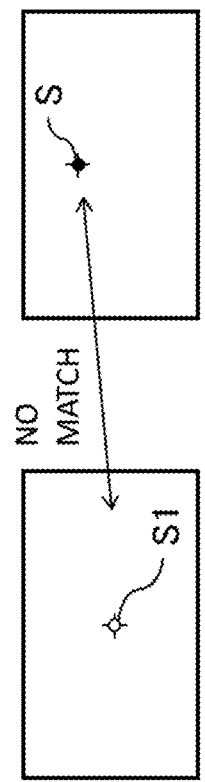
FIG. 12C is a schematic diagram illustrating actions of the reclining state determination control when the reclining seat is reclined and the monitor is upright.

Actions of the reclining state determination control S300 when the reclining seat 10 is reclined and the monitor 20 is upright will be described using FIGS. 12A, 12B, and 12C.

In step S301, the acceleration α is detected. In step S302, the image P is captured. In step S303, the reference point S is detected in the image P. In step S304, the tilt angle θ (θ=0) is calculated.

In step S305, the monitor 20 is upright, and thus the process moves to step S307. In step S307, the reference point S and the first initial reference point S1 do not match, and thus the process moves to step S309. In step S309, the reclining state of the reclining seat 10 is determined to be "reclined".

1-3-4-3. Actions (when Reclining Seat is Upright and Monitor is Tilted)

Figure 13A:
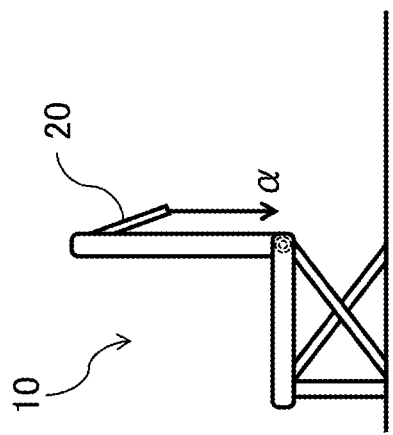
FIG. 13A is a schematic diagram illustrating actions of the reclining state determination control when the reclining seat is upright and the monitor is tilted.
Figure 13B:
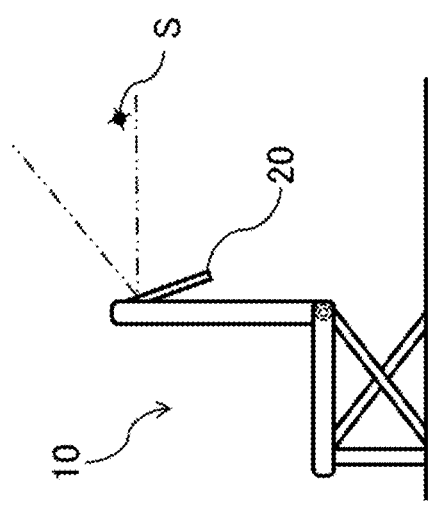
FIG. 13B is a schematic diagram illustrating actions of the reclining state determination control when the reclining seat is upright and the monitor is tilted.
Figure 13C:
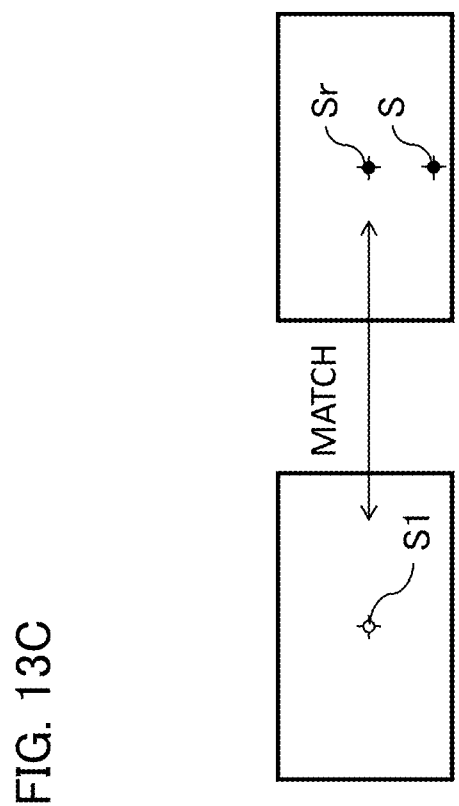
FIG. 13C is a schematic diagram illustrating actions of the reclining state determination control when the reclining seat is upright and the monitor is tilted.

Actions of the reclining state determination control S300 when the reclining seat 10 is upright and the monitor 20 is tilted will be described using FIGS. 13A, 13B, and 13C.

In step S301, the acceleration α is detected. In step S302, the image P is captured. In step S303, the reference point S is detected in the image P. In step S304, the tilt angle θ is calculated.

In step S305, the monitor 20 is tilted, and thus the process moves to step S306. In step S306, the reference point S is corrected to the corrected reference point Sr on the basis of the tilt angle θ and the correlation R. In step S307, the corrected reference point Sr and the first initial reference point S1 match, and thus the process moves to step S308. In step S308, the reclining state of the reclining seat 10 is determined to be "upright".

1-3-4-4. Actions (when Reclining Seat is Reclined and Monitor is Tilted)

Figure 14A:
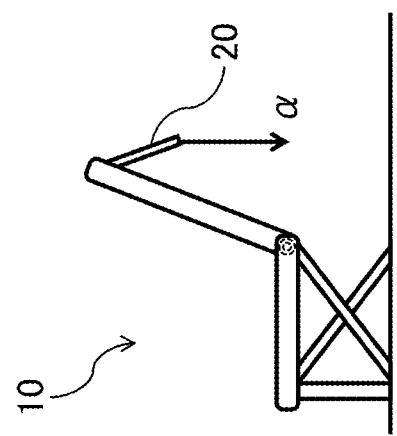
FIG. 14A is a schematic diagram illustrating actions of the reclining state determination control when the reclining seat is reclined and the monitor is tilted.
Figure 14B:
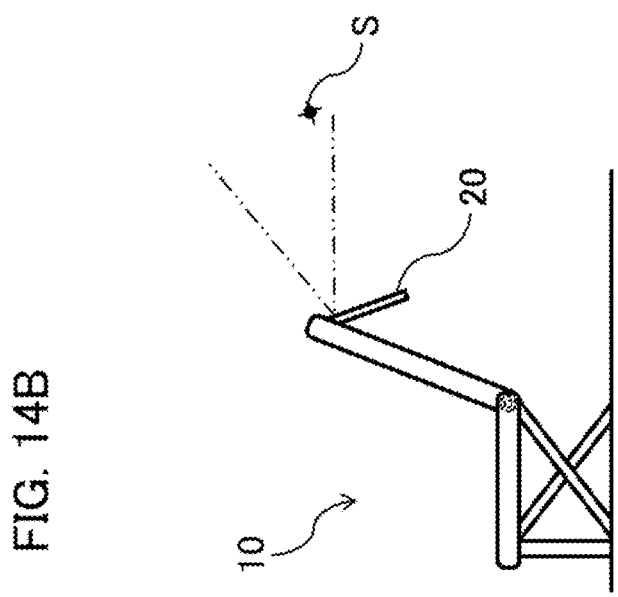
FIG. 14B is a schematic diagram illustrating actions of the reclining state determination control when the reclining seat is reclined and the monitor is tilted.
Figure 14C:
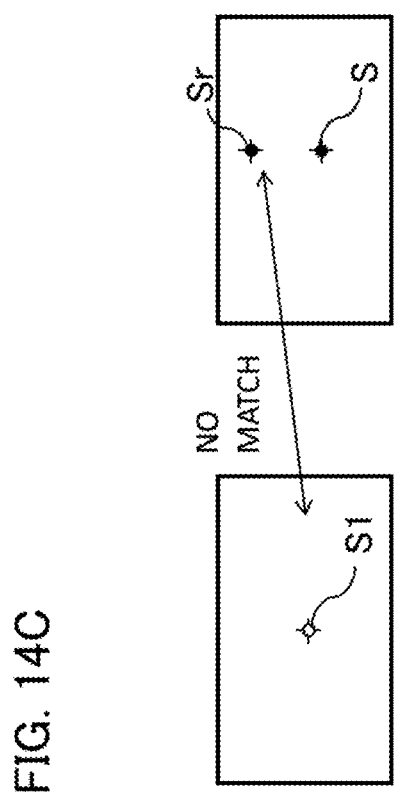
FIG. 14C is a schematic diagram illustrating actions of the reclining state determination control when the reclining seat is reclined and the monitor is tilted.

Actions of the reclining state determination control S300 when the reclining seat 10 is reclined and the monitor 20 is tilted will be described using FIGS. 14A, 14B, and 14C.

In step S301, the acceleration α is detected. In step S302, the image P is captured. In step S303, the reference point S is detected in the image P. In step S304, the tilt angle θ is calculated.

In step S305, the monitor 20 is tilted, and thus the process moves to step S306. In step S306, the reference point S is corrected to the corrected reference point Sr on the basis of the tilt angle θ and the correlation R. In step S307, the corrected reference point Sr and the first initial reference point S1 do not match, and thus the process moves to step S309. In step S309, the reclining state of the reclining seat 10 is determined to be "reclined".

2. Reclining State Determination System 2-1. Configuration

Figure 15:
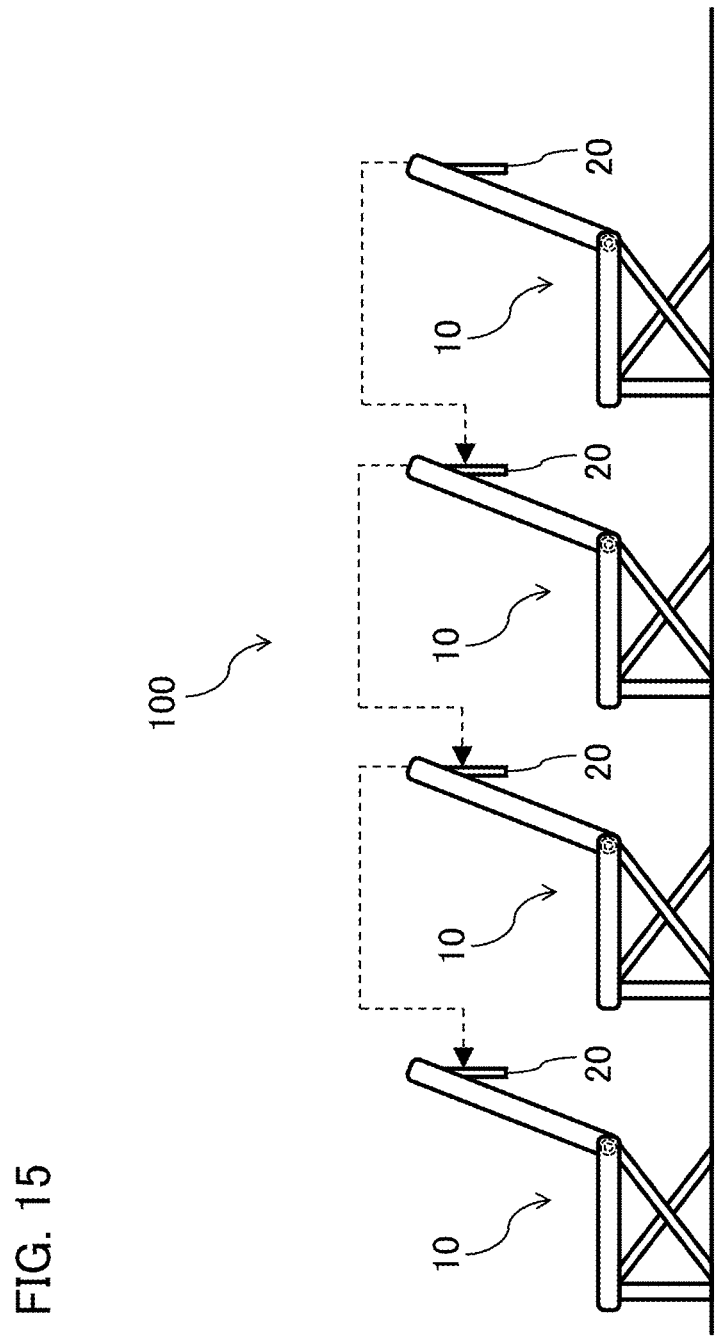
FIG. 15 is a schematic diagram illustrating the configuration of a reclining state determination system.

The configuration of a reclining state determination system 100 will be described using FIG. 15.

The reclining state determination system 100 includes the reclining state determination device 50, and the display 21 of the monitor 20 in the seat in front, serving as an output device. The reclining state determination device 50 and the display 21 in the seat in front are electrically connected. According to the reclining state determination system 100, if the reclining state of the reclining seat 10 is determined to be "reclined" in the reclining state determination control S300, an indication that the reclining seat 10 is reclined is displayed in the display 21.

2-2. Effects

Effects of the reclining state determination device 50 and the reclining state determination system 100 will be described.

According to the reclining state determination device 50 and the reclining state determination system 100, the reclining state of a reclining seat can be determined accurately.

3-1. First Variation

The configuration of a reclining state determination system 200 according to a first variation will be described using FIG. 16.

The reclining state determination system 200 includes the reclining state determination device 50, and a display device 210 serving as an output device. The display device 210 is provided in a crew terminal. The reclining state determination device 50 and the display device 210 are electrically connected. According to the reclining state determination system 200, if the reclining state of the reclining seat 10 is determined to be "reclined" in the reclining state determination control S300, an indication that the reclining seat 10 is reclined is displayed in the display 210 to catch the attention of the crew.

3-2. Second Variation

Although the above embodiment describes a configuration in which an indication that the reclining seat 10 is reclined is displayed in the display 21, the indication that the reclining seat 10 is reclined may be displayed using a warning light provided near a "fasten seatbelt" sign or a reading lamp.

3-3. Third Variation

Although the above embodiment describes a configuration in which the reclining state of the reclining seat 10 is determined to be "upright" or "reclined", the configuration may be such that, when the reclining seat 10 is reclined, the angle at which the reclining seat 10 is reclined from the upright state is determined.

3-4. Fourth Variation

Although the above embodiment describes a configuration in which the reclining state determination device 50 is built into the monitor 20, the configuration may be such that the tilt angle calculating unit 53, the reference point detecting unit 54, the determining unit 55, and the recording unit 56 are individual devices and can be attached separately to the backrest 11 or the monitor 20.

What is claimed is:

1. A reclining state determination device comprising:
a detecting unit that detects an acceleration of a display device attached to a rear surface of a reclining seat, the display device being capable of tilting;
an image capturing unit that captures an image from the display device; and
a control unit that determines a reclining state of the reclining seat on the basis of the image and the acceleration.

2. The reclining state determination device according to claim 1,
wherein the control unit determines whether or not the reclining seat is reclined.

3. The reclining state determination device according to claim 2, further comprising a recording unit,
wherein when the reclining seat and the display device are upright,
the detecting unit detects an initial acceleration,
the image capturing unit captures a first initial image,
the recording unit stores an initial tilt angle calculated from the initial acceleration and a first initial reference point detected in the first initial image, and
if a tilt angle calculated from the acceleration detected by the detecting unit matches the initial tilt angle, the control unit detects a captured reference point in the image captured by the image capturing unit and determines whether or not the reclining seat is reclined by comparing the captured reference point with the first initial reference point.

4. The reclining state determination device according to claim 2, further comprising a recording unit,
wherein when the reclining seat and the display device are upright,
the detecting unit detects an initial acceleration,
the image capturing unit captures a first initial image,
the recording unit stores an initial tilt angle calculated from the initial acceleration and a first initial reference point detected in the first initial image; and
when the reclining seat is upright and the display device is tilted by a predetermined angle relative to the reclining seat,
the image capturing unit captures a second initial image,
the recording unit stores a second initial reference point detected in the second initial image, and a correlation between a distance from the first initial reference point to the second initial reference point and the predetermined angle,
if a tilt angle calculated from the acceleration detected by the detecting unit matches the initial tilt angle, the control unit detects a captured reference point in the image captured by the image capturing unit and determines whether or not the reclining seat is reclined by comparing the captured reference point with the first initial reference point, and if the tilt angle calculated from the acceleration detected by the detecting unit does not match the initial tilt angle, the control unit detects a captured reference point in the image captured by the image capturing unit, corrects, on the basis of the tilt angle and the correlation, the captured reference point to a position that the captured reference point would be in if the display device were upright, and determines whether or not the reclining seat is reclined by comparing the corrected captured reference point with the first initial reference point.

5. A reclining state determination system comprising:
the reclining state determination device according to claim 1; and
an output device that outputs the reclining state of the reclining seat at a predetermined time including when an aircraft takes off or when the aircraft lands.

6. A reclining state determination method comprising:
detecting an acceleration of a display device attached to a rear surface of a reclining seat, the display device being capable of tilting;
capturing an image from the display device; and
determining a reclining state of the reclining seat on the basis of the image and the acceleration.

7. The reclining state determination method according to claim 6,
wherein whether or not the reclining seat is reclined is determined on the basis of the image and the acceleration.

8. The reclining state determination method according to claim 7,
wherein when the reclining seat and the display device are upright,
an initial acceleration is detected, a first initial image is captured, and an initial tilt angle calculated from the initial acceleration and a first initial reference point detected in the first initial image are stored, and
if a tilt angle calculated from the detected acceleration matches the initial tilt angle, a captured reference point is detected in the captured image and whether or not the reclining seat is reclined is determined by comparing the captured reference point with the first initial reference point.

9. The reclining state determination method according to claim 7,
wherein when the reclining seat and the display device are upright,
an initial acceleration is detected, a first initial image is captured, and an initial tilt angle calculated from the initial acceleration and a first initial reference point detected in the first initial image are stored; and
when the reclining seat is upright and the display device is tilted by a predetermined angle relative to the reclining seat,
a second initial image is captured, a second initial reference point detected in the second initial image is stored, and a correlation between a distance from the first initial reference point to the second initial reference point and the predetermined angle is stored,
if a tilt angle calculated from the detected acceleration matches the initial tilt angle, a captured reference point is detected in the captured image and whether or not the reclining seat is reclined is determined by comparing the captured reference point with the first initial reference point, and
if the tilt angle calculated from the detected acceleration does not match the initial tilt angle, a captured reference point is detected in the image captured by the image capturing unit, the captured reference point is corrected, on the basis of the tilt angle and the correlation, to a position that the captured reference point would be in if the display device were upright, and whether or not the reclining seat is reclined is determined by comparing the corrected captured reference point with the first initial reference point.

* * * * *